United States Patent
James et al.

[15] 3,644,922
[45] Feb. 22, 1972

[54] HIGH-RESOLUTION FIBER OPTIC DISPLAY AND MICROFILM PRINTER

[72] Inventors: Richard N. James; James E. Applequist, both of San Jose; Daniel M. Roberts, Saratoga, all of Calif.

[73] Assignee: Image Products Corporation, Santa Clara, Calif.

[22] Filed: July 14, 1969

[21] Appl. No.: 841,485

[52] U.S. Cl. ...................340/324 R, 178/15, 178/30, 340/336, 350/96
[51] Int. Cl. ...........................................G09f 9/34
[58] Field of Search ................340/324, 334, 336; 350/96; 178/15, 30

[56] References Cited

UNITED STATES PATENTS

| | | | |
|---|---|---|---|
| 2,765,458 | 10/1956 | Hoover | 340/324 |
| 3,359,366 | 12/1967 | Magleby | 178/30 |
| 3,379,890 | 4/1968 | Krieter | 178/30 |
| 3,420,949 | 1/1969 | McNaney | 340/324 |

Primary Examiner—John W. Caldwell
Assistant Examiner—Marshall M. Curtis
Attorney—Limbach & Limbach

[57] ABSTRACT

A computer output display with a plurality of light sources shining through optical fibers. A line of rectangular fiber bundles at the display end display selected characters depending on which fibers are illuminated in each bundle, and the light source ends of fibers from different bundles are connected to common light sources so that the same characters are displayed simultaneously on many bundles in the line. Scanning means for the line limits the operative area of the line at any instant to a set of fiber bundles which can all display different characters. The fibers are woven from a continuous strand while the fiber portions which end up as the light displaying and light receiving ends of individual fibers are properly supported in a line and collected into bundles respectively.

6 Claims, 11 Drawing Figures

Patented Feb. 22, 1972

INVENTORS
RICHARD N. JAMES
JAMES E. APPLEQUIST
DANIEL M. ROBERTS

BY *Limbach and Limbach*

ATTORNEYS

Patented Feb. 22, 1972
3,644,922
4 Sheets-Sheet 2
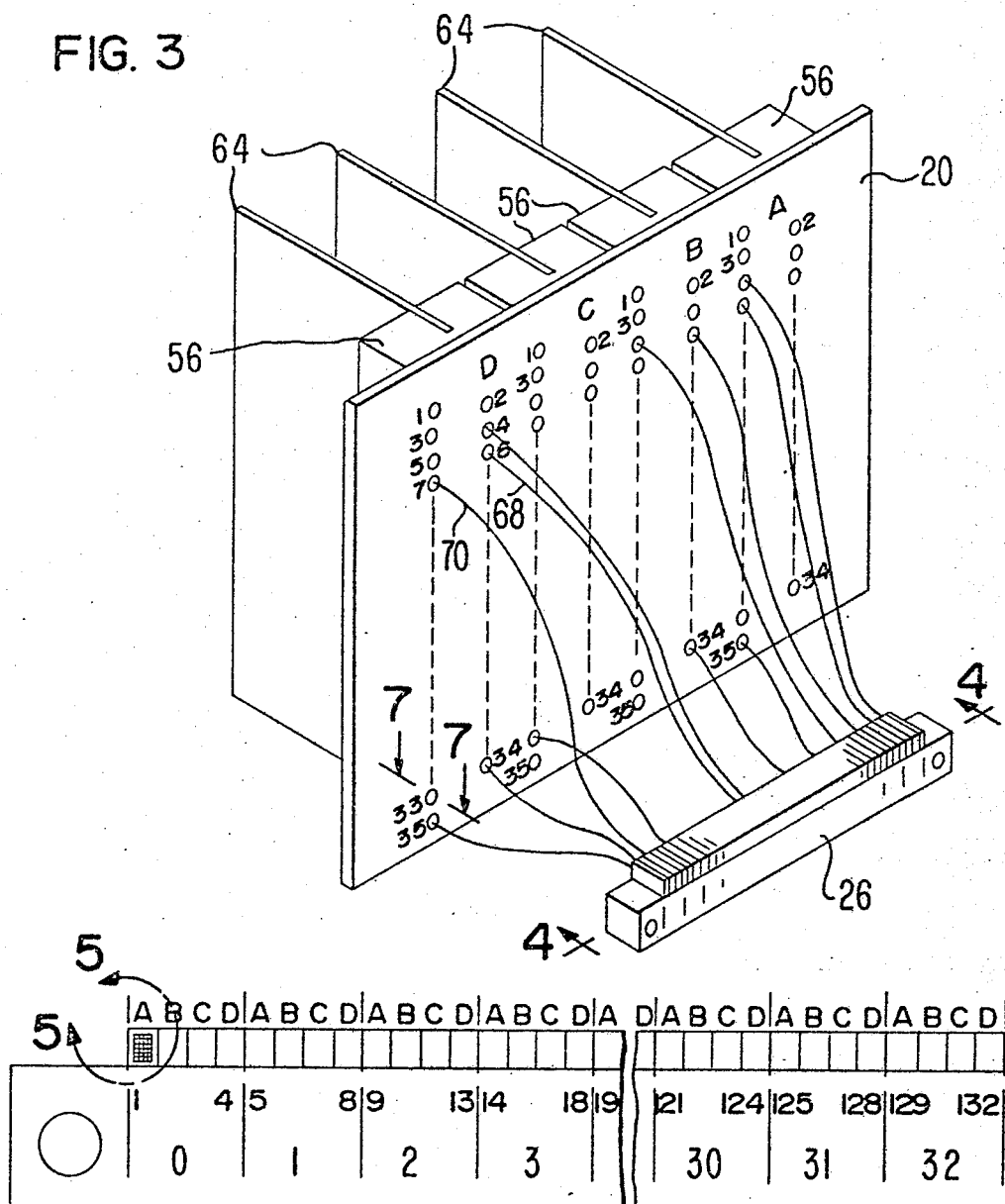
FIG. 3
FIG. 4
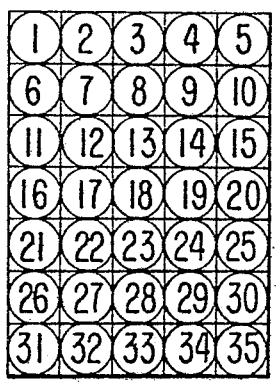
FIG. 5
INVENTORS
RICHARD N. JAMES
JAMES E. APPLEQUIST
DANIEL M. ROBERTS
BY *Limbach and Limbach*
ATTORNEYS

INVENTORS
RICHARD N. JAMES
JAMES E. APPLEQUIST
DANIEL M. ROBERTS

BY Limbach and Limbach

ATTORNEYS

Patented Feb. 22, 1972

INVENTORS
RICHARD N. JAMES
JAMES E. APPLEQUIST
DANIEL M. ROBERTS

BY *Limbach & Limbach*

ATTORNEYS

HIGH-RESOLUTION FIBER OPTIC DISPLAY AND MICROFILM PRINTER

This invention relates to an information display and a method for making the same where the information display is designed particularly for use in a computer output printer by which the information output of the computer may be printed onto microfilm.

It is a principal object of this invention to provide an information display by which an image of a plurality of characters may be arranged along a line at very high speed so that the image may be photographed by additional apparatus.

It is another object of the invention to provide such an information display in which the act of selecting a particular character to be displayed at a particular position along the line can be accomplished electronically without the need for moving mechanical parts.

It is another object of the invention to provide such an information display which can display a long line of characters on a line-by-line basis so that a complete line of characters can be photographed in a single step between successive irregular film advancing steps.

In accordance with this invention, an image of a line of characters is provided with a matrix of optical fibers in which the light transmitting ends of the fibers are arranged in rectangular arrays where each array is a character generator capable of generating an image of any desired character depending upon the particular fibers in the array that are illuminated. The rectangular arrays of fibers are arranged in a line so that a full line of characters can be displayed without moving parts.

In order to display computer output data effectively, the information display of this invention employs 132 character generators arranged along a line where each character generator is made up of a five by seven rectangular array of 35 optical fibers. The overall information display thus employs 4,620 optical fibers. The optical fibers are illuminated by suitable fast acting light sources such as light emitting diodes, and a special fiber bundle collection technique and scanning mechanism is employed so that the information display requires only a small fraction of 4,620 light emitting diodes.

Thus, with the information line in the device divided into 132 groups of fibers for displaying as many characters, the 132 character generators are divided into sets where the character generators in each set are arranged side by side along the line and the sets of character generators are arranged sequentially along the line. The individual optical fibers in each of the sets of character generators are connected to different light sources from the light sources which illuminate all of the other optical fibers in that set, but similar optical fibers in all of the sets are connected together to be illuminated by a single light source.

With the display line divided into sets in this way, a single character displayed in one set of character generators is also displayed simultaneously in all of the other sets of character generators. In order to provide that a character which is illuminated in all of the sets is photographed in only the one position along the information line where it is desirable to record that character, a scanning mechanism is provided for displaying, at any instant, only a portion of the length of the information line where the portion displayed is narrower than one of the sets of character generators.

The number of character generators in each set is between three and 13 and preferably all of the sets contain four character generators or all of the sets contain six character generators. The division of the information line into sets of character generators of this size provides a substantial savings in the cost of the manufacture of the device because of the substantial reduction in the number of light emitting diodes and related circuit components which are needed while at the same time providing an information display for a computer output microfilm printer which can accept information rapidly enough from the computer, provide sufficient exposure time for microfilm, and provide sufficient switching time for a character generator to be switched from displaying one character to displaying another character.

In the latter regard, the scanning mechanism used for scanning the various sets of character generators preferably displays, at each instant, one less character than there are character generators in each set in order that the similar character generators in two adjacent sets which are connected together and simultaneously display the same character may be positioned with one of them just behind the scanning means (having displayed a character which was photographed) and the other positioned just ahead of the scanning means (where it is the next character generator to provide a character to be photographed). In this situation, the two character generators can be switched to display a different character from the one that we have been displaying so that they provide images of different characters to a microfilm printer even though they displayed the same characters at every instant.

It will be apparent that the assembly of the information display of this invention may be very tedious because of the large number of individual optical fibers each one of which must be routed between a particular position on the information display line and a particular light source. This tedious work of assembly may be avoided in accordance with the method of this invention in which the same line of fibers in a large number of character generators are assembled at the same time, and the full bank of character generators is then assembled from the subassemblies of individual lines. This method of assembly has several distinct advantages over and above the saving in labor which it accomplishes. Thus, difficulties may be encountered in assembling the rectangular matrix of optical fibers in each character generator because of the generally cylindrical shape of each fiber. This occurs because of the tendency of intermediate fibers in the array to move into the trough between adjacent fibers rather than resting directly on top of or beside another fiber in the array. When the character generators are made on a line by line basis as mentioned above, all of the fibers in a single line may be cemented together into a flat wafer thereby eliminating the troughs which tend to create misalignment.

When all of the fibers in a given line of the information display are preassembled in this way, it is desirable to insert spacers between the fibers of adjacent character generators before the full line of fibers is cemented together so that the spacers may be removed subsequently and the line of the fibers for each character generator thereafter assembled with the other lines of fibers for that character generator. The full character generator may be assembled in this way by prefabricating a comb which contains spaces for the character generators and teeth separating adjacent character generators with the wafers of prefabricated and cemented fibers placed on top of each other in layers in the spaces in the teeth. In this manner, the entire information display may be assembled with blank spaces between the character generators setting off different characters from each other in the final display. Additionally, the fabrication of the character generators in this way, subdividing the preassembled line of fibers into the individual groups of fibers which make up fiber lines in each character generator, eliminates cumulative dimensional errors which may be introduced in the line of fibers by dimensional variations in individual fibers.

The method of assembling the fiber optic display of this invention may be performed with individual precut lengths of optical fiber material, but preferably the method is performed by weaving a full line of optical fibers in the information display from a continuous strand of optical fiber material where the strand is passed back and forth between a first station where the fibers are supported flat for ultimate use in the display end of the device and a second station where similar fibers from the different sets of character generators are collected into individual bundles for illumination by a single light source. Whether the method is performed with short lengths of fibers or with a single continuous strand, the method of assembling the device by assembling a full line of fibers for the whole information display at a single time permits all of the fibers which must be collected together at a single light source to be assembled in one operation.

Other features and advantages of the invention will become apparent from the following description of one preferred embodiment of the invention in which:

FIG. 3 is a perspective view of some of the parts in the interior of the apparatus of FIG. 1;

FIG. 4 is an enlarged face view of the line of character generators in the information display of FIGS. 1-3;

FIG. 5 is an enlarged view of the face of one of the character generators in FIG. 4 with the individual fibers in the five by seven array of fibers numbered for convenient reference;

Figure 1:
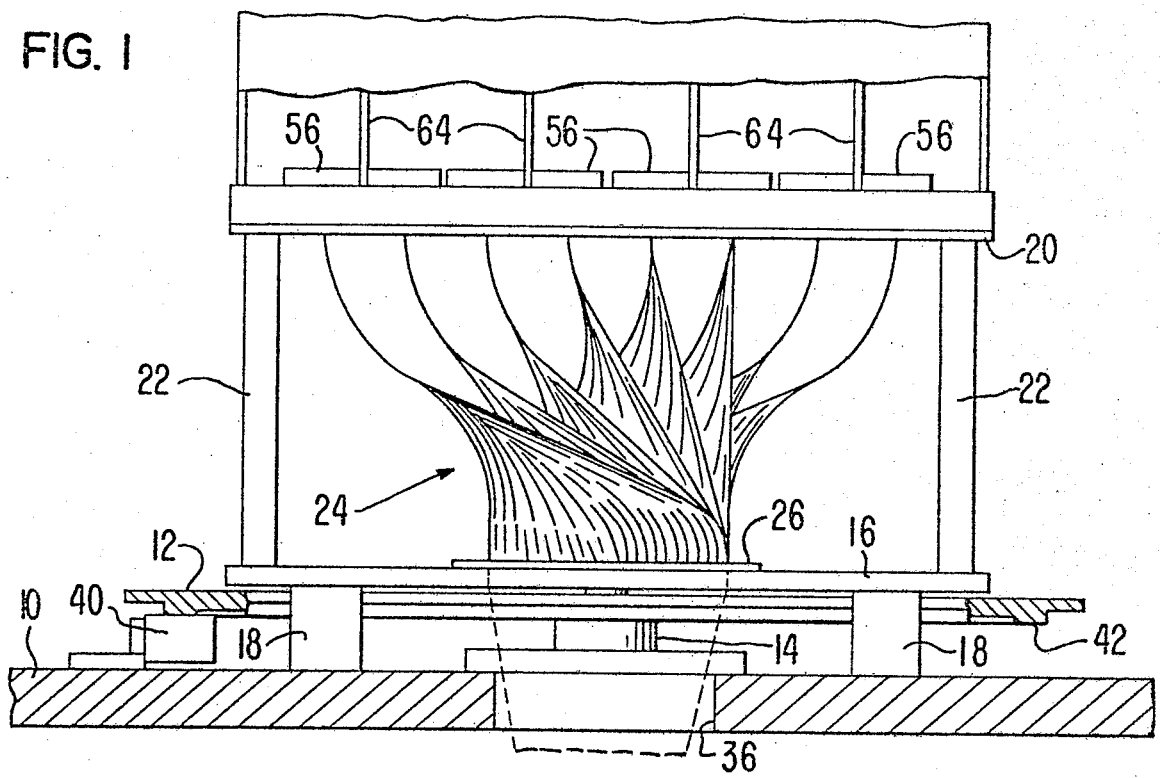
FIG. 1 is a top plan view of an information display constructed in accordance with the principles of this invention.

Referring now in detail to the drawings and particularly to FIG. 1, the information display illustrated therein includes a front support plate 10, a rotary shutter wheel 12 rotatably mounted on the support plate 10 at an axle 14, and a rear support plate 16 mounted on the front plate 10 by pedestals 18 which are located above the upper circumference of shutter wheel 12. A rear support plate 20 is mounted on the support plate 16 by pedestals 22 and a plurality of optical fibers 24 extend between the support plates 16 and 20.

Figure 6:
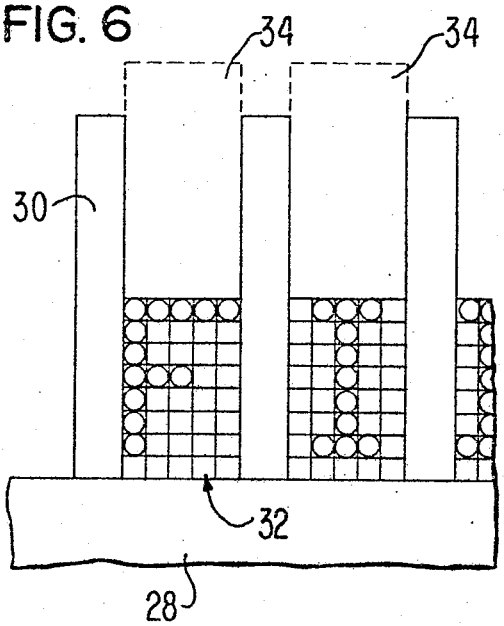
FIG. 6 is a face view on an enlarged scale of a portion of the character bank of FIG. 4.

The front ends of the optical fibers 24 are mounted in a display block 26 illustrated generally in FIG. 3 and shown in greater detail in FIGS. 4, 5, and 6. As illustrated in FIG. 6, the display block 26 preferably comprises a baseplate 28, a metal comb structure 30 mounted on the baseplate, a plurality of character generators 32 supported in the slots of the comb 30, and a plurality of metal spacers 34 which are inserted into the tops of the slots of the comb 30 and hold the character generators 32 in place.

With reference to FIG. 4, the display block 26 supports a line of 132 character generators indicated by numbers 1-132 which are divided into 33 sets numbered 0-32 of four character generators in each set. The four character generators in each of the sets are labeled on FIG. 4 for convenience with the letters A, B, C and D so that any character may be referred to by its position in its set where, for instance, the 15th character is character C in set 3 and the second character is character B in set 0.

As illustrated in FIG. 5, each of the character generators is formed of a five by seven array of 35 optical fibers arranged five fibers wide along the length of the character display. Any character may be displayed at any character position along the length of the character bank 26 by illuminating a predetermined pattern of the 35 optical fibers in that character generator.

As mentioned above, the fibers from different sets 0-32 are connected to the same light sources so that when any character generator, for instance B in set 0, is illuminated with a particular character, every other set contains an identical character on its similar character generator B.

Thus, every fiber number 23 from every one of the 33 character generators B is connected to one light source; every optical fiber 35 in every character generator B in the 33 sets is connected to the same light source different from the light source illuminating the above-mentioned fibers 23, and every optical fiber 35 in every one of the 33 character generators A is connected to the same light source different from the light sources which illuminate fibers 23B and fibers 35B.

Figure 2:
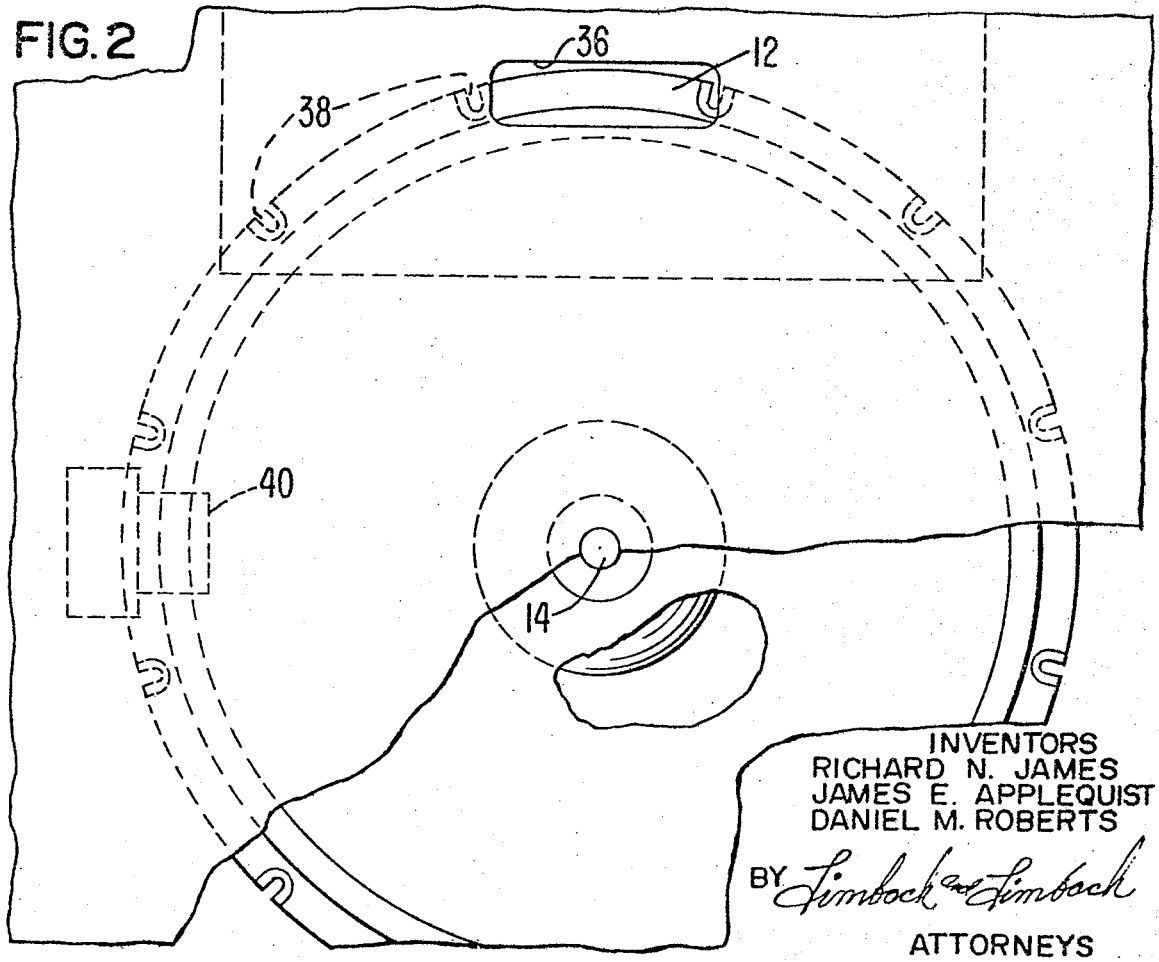
FIG. 2 is a face view of the apparatus of FIG. 1, (viewed from the bottom of FIG. 1)

As indicated in FIGS. 1 and 2, the front mounting plate 10 is provided with an aperture 36 through which the line of character generators 26 may be viewed with the shutter wheel 12 interposed between the character generators and the aperture 36. A plurality of shutter slots 38 are provided in the periphery of the shutter wheel 12 for scanning across the aperture 36, and each of the slots 38 has a width slightly less than the width of three of the character generators in the display bank 26. A transducer such as magnetic reading head 40 is preferably mounted on the back of mounting plate 10 cooperating with a track 42 by which signals may be generated indicating the relative position of each of the slots 38 on the shutter wheel 12 to the characters in the character bank so that the three character generators exposed in aperture 36 through one of the slots 38 will be illuminated with characters denoting output data which is to be displayed to a microfilm printer.

Figure 7:
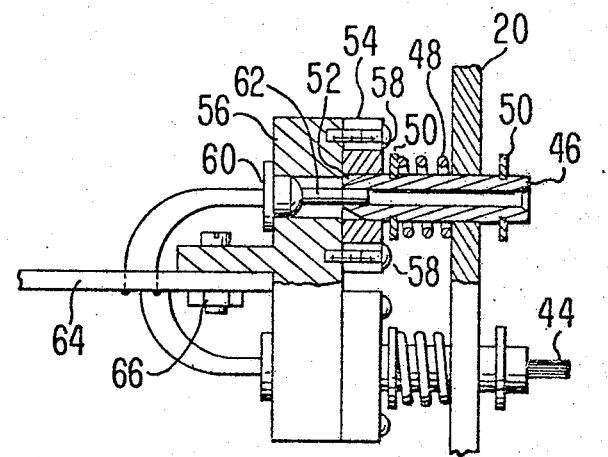
FIG. 7 is a sectional view taken along the plane indicated at 7—7 in FIG. 3 and illustrating the manner in which individual fiber bundles are connected to light emitting diodes.

As indicated above, 33 optical fibers, one from each of the sets 0-32 are connected to be illuminated by each of a plurality of light sources. With reference to FIGS. 3 and 7, each of these bundles of 33 fibers 44 is mounted in a cylindrical sleeve 46 supported in an aperture in the rear support plate 20. The sleeves 46 are preferably adjustably mounted to assure good registry with the light sources for which purpose each of the sleeves carries a compression spring 48 and a pair of snap rings 50. The rearward end of the sleeve 46 is tapered as illustrated at 52 to facilitate its entry into an alignment hole in a guide block 54. The guide block 54 is attached to a support plate 56 by screws 58, and a light emitting diode 60 is mounted in a hole in the plate 56 aligned with the hole in mounting bracket 54. As illustrated in FIG. 7, the holes in bracket 54 through which screws 58 pass are preferably enlarged so that bracket 54 may be accurately located and then clamped with its center axis aligned with the center of light emitting diode 60, and a single large optical fiber 62 may be provided on the light emitting diode 60 to distribute its emitted light over an enlarged area which will cover the ends of all of the 33 fibers 44 in the sleeve 46. A printed circuit board 64 is attached to support plate 56 by bolt 66, and light emitting diodes are preferably provided on opposite sides of the circuit board 64 distributed along the full length of the bracket 56.

As illustrated in FIGS. 1 and 4, the optical fibers 24 are connected from the fiber bank 26 to sleeves 46 in two columns on each side of each of the circuit boards 64 so that all of the light emitting diodes 60 for the character generators A, B, C or D in each of the 33 sets of character generators are mounted adjacent to each one of the four circuit boards 64. This arrangement has been employed in one method of manufacture where the optical fibers for each character generator are preassembled in the character bank 26 prior to routing of the optical fibers to corresponding sleeves 46 at the illumination end of the fibers near support plate 20. In this method, a special tool was employed containing five optical fibers mounted side by side and illuminated with different colored lights. The special tool was positioned in alignment with one of the seven vertically spaced rows of fibers in each of the character generators at a time so that a workman could tell from the illumination colors in the fibers which fibers were positioned in which place in a particular character generator in the character bank. With one specific group of fibers thus illuminated, the free ends of predetermined fibers could be identified for location in proper sleeves 46 at the illumination end of the fibers near support plate 20. For instance, with the special tool mounted in alignment with the second row of fibers from the top of character generator D in character generator set 3, red and green lights would shine through fibers nos. 6 and 7 in that character generator, and from the shining light an operator could identify fibers indicated by nos. 68 and 70, respectively in FIG. 4 and thread those fibers into sleeves 46 located at the positions indicated at D6 and D7, respectively, in FIG. 4. This assembly method permitted the entire group of optical fibers 24 to be assembled in proper relation, but it will be apparent that this method was very tedious and time consuming.

The preferred method of assembling the optical fibers 24 is illustrated in FIGS. 8–11 where a central frame 72 having an entry slot 74 defines a first fiber holding station for holding the optical fibers in a flat line, the slot 74 having a width slightly greater than the fiber diameter but less than twice the fiber diameter. A second fiber holding station is provided in the form of a comb 76 which contains a number of slots 78 equal to the number of fibers in one line of fibers in each of the sets 0–32 in FIG. 4. With the character generator arranged in sets as illustrated in FIG. 4, the combs 76 contain 20 slots 78 corresponding to the five optical fibers in each of the four character generators in one of the 33 sets of characters.

A third fiber holding station 80 is mounted on the opposite side of the first fiber holding station 72 and contains a similar number of fiber receiving slots.

On the outsides of the second and third fiber holding stations 76 and 80 a plurality of pins 82 are mounted defining first and second fiber turnaround stations 84 and 86, respectively.

This apparatus may be employed to preassemble the optical fibers 24 which define each complete line of fibers in the character bank 26 with the fibers preassembled not only in the orientation which they should occupy in the character bank 26, but also collected together in the proper fiber bundles which are to be connected to individual light emitting diodes. In this regard, it will be noted that the slot 74 will receive for a full line of fibers a total number of 660 fibers, and each of the combs 76 and 80 contains 20 slots 78, each of which will receive 33 fibers, one from each of the 33 sets of character generators 0–32.

Figure 8:
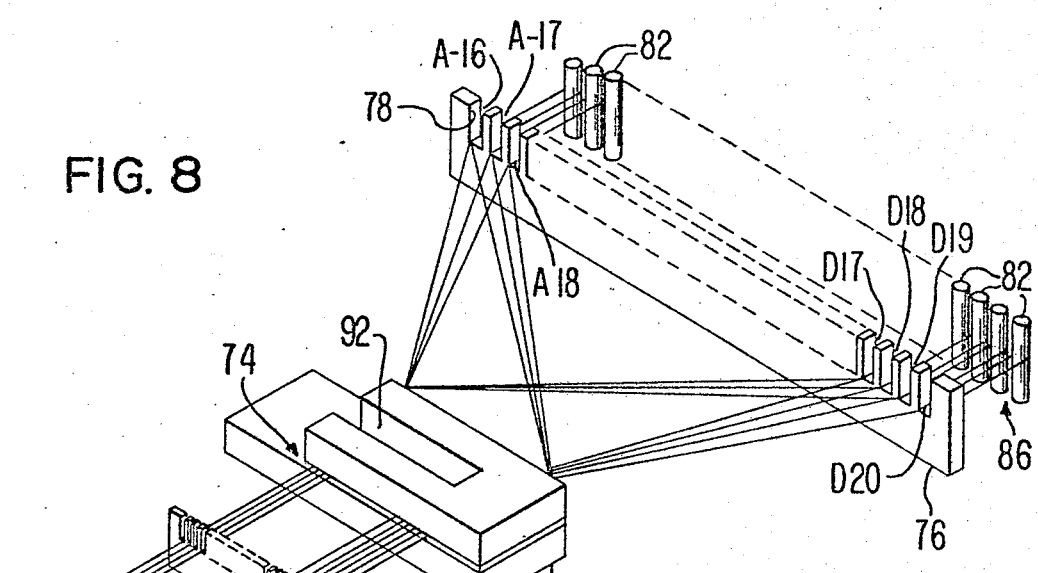
FIG. 8 is a schematic diagram illustrating the manner in which the method of the invention may be performed.

The apparatus of FIG. 8 may be employed for preassembling each line of optical fibers by passing a continuous strand of fiber optic material through the slot 74 in the first fiber holding station 72, hence through one of the slots 78 in the second fiber holding station 76, hence around one of the pins 82 in the second turnaround station 86, hence back through a different one of the slots 78 in the second fiber holding station 76, hence through the slot 74 in the first fiber holding station 72, and hence back through one of the slots in the third fiber holding station 80, hence around the first fiber turnaround station 84 and through a different slot in the third fiber holding station 80 and back through slot 74 in fiber holding station 72 to continue the process until a full line of fibers has been woven.

Figure 9:
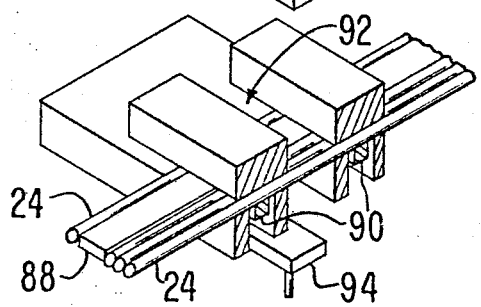
FIG. 9 is a schematic perspective view showing a cross section through the apparatus of FIG. 8 and illustrating auxiliary parts which are preferably employed with the apparatus shown in FIG. 8.

For reasons which will appear hereinafter, it is desirable to provide spacers between the fibers of adjacent character generators in each of the lines of fibers which are preassembled in the first fiber holding station 72, and for this purpose, spacer 88 is illustrated in FIG. 9 where spacer 88 has a width corresponding to the space between adjacent character generators in the character bank 26. Also as illustrated in FIG. 9, a variety of means may be employed such as small conveyor belts 90 for moving the fibers 24 and spacers 88 automatically toward one end of the slot 74 in the first fiber holding station 72.

The apparatus and technique described in connection with FIGS. 8 and 9 above may be employed for preassembling a full line of fibers either from a single strand of fiber optic material or from precut lengths of fiber optic material, the latter being preferable where difficulties are encountered in obtaining extremely long strands of fiber optic material of uniform diameter.

When a full line of optical fibers has been assembled as illustrated in FIGS. 8 and 9, the fibers are preferably attached together to fix the individual fibers in position and prevent them from becoming disarranged in later stages of assembly of the total information display. For this purpose, the fibers are preferably cemented together in a central slot 96 in the first fiber holding station 72 by application of epoxy resin in said slot cured by a pair of heated platens 94. The cementing of the adjacent fibers in this way and curing of the cement with heated platens is particularly desirable for the purpose of preassembling the fibers in flat wafers as mentioned above to eliminate the problem of individual fibers moving into grooves between other preassembled fibers in the final three by five arrays of fibers in each character generator. The other ends of the fibers in the slots 78 in the second and third fiber holding stations 76 and 80 may similarly be attached together, and it may be convenient to lightly fix the fibers between the first fiber holding station 72 and the second and third fiber holding stations 76 and 80 as by spraying the matt of fibers in this area with conventional hair spray.

Figure 10:
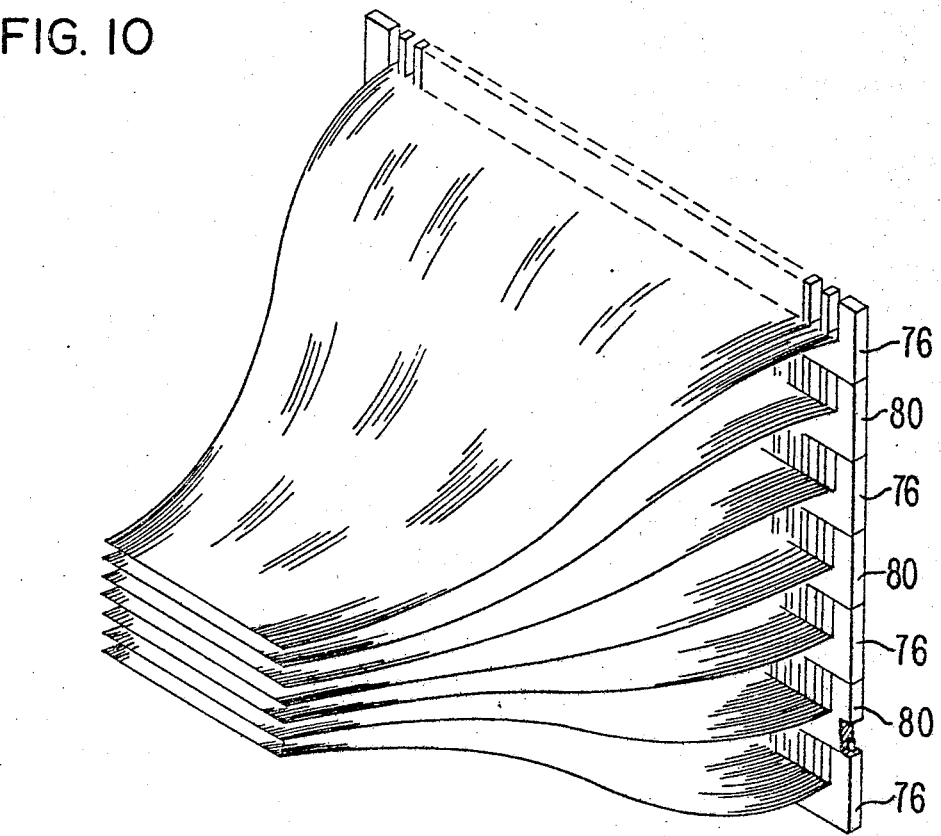
FIG. 10 is a perspective view of a plurality of lines of optical fibers prepared in accordance with FIGS. 8 and 9 partially assembled together.

It will be apparent that the preassembled line of fibers prepared as described above may be removed from the first fiber holding station 72 and cut along a central line where the fibers are joined together to provide two lines of fibers for subsequent assembly into the character displays 26 while the fibers are also cut between the second fiber holding station 76 and second turn around station 86 and between the third fiber holding station and the first turn around station 84. The two lines of preassembled fibers may be used in fabrication of the final information display 26 in this specific form where, for instance, the second and third fiber holding stations 76 and 80 are designed for direct incorporation into the support frame 20 as illustrated in FIG. 10, or in the alternative, the groups of 33 fibers preassembled in the slot 76 in the second and third fiber holding stations may be removed and inserted into suitable support apparatus such as the sleeves 46 illustrated in FIG. 7. Similarly, the lines of optical fibers preassembled in the first fiber holding station 72 may be incorporated as such into an information display 26, but preferably each preassembled line of fibers is subdivided for insertion into the comb 30 of FIG. 6 so that cumulative dimensional errors caused by different fiber diameters can be avoided as described above.

In this regard, the spacers 88 illustrated in FIG. 9 which are inserted between the fibers of adjacent character generators are preferably made of a material which may be removed subsequently without damage to the preassembled group of fibers. These spacers 88 may, for instance, be made of magnesium which may be etched out of the assembled lines of fibers in a caustic solution. In this regard, the partial fixing of the matt of optical fibers with hair spray is beneficial in preserving the relation between individual five fiber groups after the spacers 88 have been removed.

Figure 11:
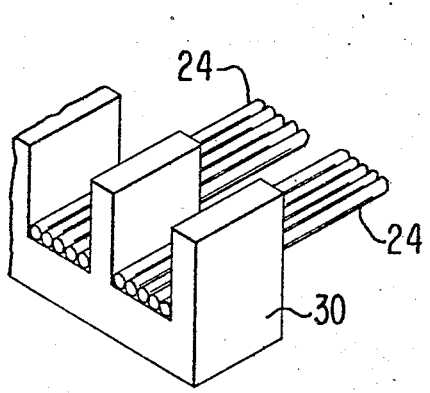
FIG. 11 is a perspective view of a small fragment of the fibers of FIG. 10 assembled into an information display.

When each of the line of fiber optics are assembled as illustrated in FIGS. 8 and 9, with the spacers 88 subsequently removed as described above, the preassembled wafers of five optical fibers for each character generator may then be inserted in layers in the comb 30 for the character bank 26 as illustrated in FIG. 11. In this situation, the complete optical display 26 is assembled from 7 prefabricated lines of optical fibers prepared in accordance with the procedure of FIGS. 8 and 9 to give a final assembly which includes the five by seven arrays of optical fibers described in FIG. 5, and the fiber bundles at both the character bank 26 and support plate 20 may be subjected to final trimming and polishing operations which are well known in the fiber optics art. Where this technique of prefabricating individual lines of the optical fibers is employed, it may be desirable to reorient the individual groups of 33 fibers at the support plate 20 so that the groups of 33 fibers for each of the seven different lines of fibers in the fiber arrays are located at seven different levels of support plate 20 for connection to seven different circuit boards 64 as illustrated in FIG. 10.

We claim:

1. (twice amended) An information display comprising:
   A. a plurality of optical fibers having light receiving ends and light transmitting ends with said fibers divided into a plurality of groups:
   1. the fibers in each of said groups having their light transmitting ends arranged in a rectangular array for displaying different characters when light is transmitted through different subcombinations of the fibers of that group, and 2. said groups of fibers having their rectangular arrays of light transmitting ends arranged in a line for displaying a line of characters;

B. a plurality of light sources connected to the light receiving ends of said fibers for transmitting light through said fibers with each of the fibers in one of said groups connected to one of said light sources different from the light sources to which the remaining fibers in that group are connected whereby light may be transmitted through any subcombination of said fibers in said group[s] to display any character [at any position along said line,]; and C. means for selectively lighting said light sources;

D. said groups of fibers being arranged in a plurality of similar sets of fiber groups with the light transmitting ends of the fiber groups in each set arranged side by side along said line and with the light transmitting ends of said sets arranged sequentially along said line; and E. the corresponding fibers in corresponding groups of all of the sets of groups being connected to the same light source, and every fiber in one set being connected to a light source different from the light sources to which all of the other fibers in that set are connected whereby the said character can be displayed at any position within a set, any pattern of characters can be displayed in any one of said sets, and the same pattern of characters is displayed simultaneously in all of said sets.

2. The information display of claim 1 characterized further by the inclusion of scanning means for scanning said line while displaying, at any instant, a portion of the length of said line which is narrower than the light transmitting end of one of said sets.

3. The information display of claim 2 in which there are 132 of said groups of fibers with their rectangular arrays of light transmitting ends arranged side by side along said line; there are 35 of said fibers in each of said groups with the light transmitting ends thereof arranged in a five by seven rectangular array five fibers wide measured along the length of the line and each of said sets contains a number of groups of said fibers which is between three and 13 and an integral divisor of 132.

4. The information display of claim 3 in which each of said sets contains four of said groups of said fibers, and there are 140 of said light sources connected to said fibers.

5. The information display of claim 3 in which each of said sets contains 6 of said groups of said fibers, and there are 210 of said light sources connected to said fibers. pattern of characters can be displayed in any one of said sets, and the same pattern of characters is displayed simultaneously in all of said sets.

6. (twice amended) An information display comprising:

A. a plurality of character generators mounted side by side along a line with said character generators arranged in a plurality of similar sets with the character generators in each set arranged side by side along the line and with the sets arranged sequentially along the line;

B. driving means connected to said character generators to display a plurality of different characters on each of said character generators with similar character generators in each of said sets connected together whereby any pattern of characters can be displayed in one of said sets and the same pattern of characters is displayed simultaneously in all of said sets; and C. scanning means for scanning said line while displaying, at any instant, a portion of the length of the line which is not substantially larger than one of said sets.

* * * * *